(12) United States Patent
Kuehner et al.

(10) Patent No.: US 8,485,762 B2
(45) Date of Patent: Jul. 16, 2013

(54) INTERNAL BROACHING TOOL

(75) Inventors: Juergen Kuehner, Zella-Mehlis (DE); Ernst Hettmann, Oelbronn-Duerrn (DE)

(73) Assignee: Spezial Werkzeuge GmbH Zella-Mehlis, Zella-Mehlis/Thueringen (DE)

( * ) Notice: Subject to any disclaimer, the term of this patent is extended or adjusted under 35 U.S.C. 154(b) by 167 days.

(21) Appl. No.: 12/998,314

(22) PCT Filed: Oct. 17, 2009

(86) PCT No.: PCT/DE2009/001455
§ 371 (c)(1),
(2), (4) Date: Apr. 7, 2011

(87) PCT Pub. No.: WO2010/045927
PCT Pub. Date: Apr. 29, 2010

(65) Prior Publication Data
US 2011/0195375 A1     Aug. 11, 2011

(30) Foreign Application Priority Data
Oct. 24, 2008 (DE) .......................... 10 2008 053 156

(51) Int. Cl.
*B23D 43/02* (2006.01)
*B23F 21/26* (2006.01)

(52) U.S. Cl.
USPC .............................................. 407/13; 407/18

(58) Field of Classification Search
USPC .......................... 407/13, 18, 19; 409/259, 287
See application file for complete search history.

(56) References Cited

U.S. PATENT DOCUMENTS

| 1,197,132 A | | 9/1916 | Lapointe |
| 2,161,901 A | * | 6/1939 | Praeg ............................... 407/18 |
| 2,320,787 A | * | 6/1943 | Mentley .......................... 407/13 |
| 2,986,801 A | | 6/1961 | Mentley |
| 3,178,800 A | * | 4/1965 | Psenka ............................ 407/16 |
| 3,227,008 A | * | 1/1966 | Celovsky ..................... 76/101.1 |

(Continued)

FOREIGN PATENT DOCUMENTS

| EP | 0 739 674 | 10/1996 |
| EP | 1 160 040 | 12/2001 |

(Continued)

OTHER PUBLICATIONS

Din 1415 (1973 edition), Sheet 1, p. 2 and pp. 12-16 with English translation of terms. (Spec, p. 1).
International Search Report, May 27, 2011.

*Primary Examiner* — Will Fridie, Jr.
(74) *Attorney, Agent, or Firm* — Collard & Roe, P.C.

(57) ABSTRACT

An internal broaching tool for broaching profiles delimited by a root and flanks in one aspect arranges a relief part between the toothed part and the calibration part. The calibrating broaching teeth in adjacent rows on the calibration part have a guiding flank (without a clearance angle or with a maximum negative clearance angle of 0.1°) and a cutting flank (with a positive clearance angle). The guiding flanks and the cutting flanks on the calibrating broaching teeth located behind each other in the direction opposite the broaching direction are alternately offset relative to each other in adjacent rows. The position, shape, and size of each guiding flank located downstream in relation to the direction opposite the broaching direction are associated with the position, shape, and size of the associated cutting flank (or the flank of the broaching tooth) in the preceding row.

5 Claims, 8 Drawing Sheets

U.S. PATENT DOCUMENTS

| | | | |
|---|---|---|---|
| 3,439,398 A * | 4/1969 | Jacobson et al. | 407/16 |
| 6,857,827 B2 | 2/2005 | Heyraud | |
| 6,918,716 B2 | 7/2005 | Berktold et al. | |
| 7,326,012 B2 * | 2/2008 | Schlotter | 409/259 |
| 7,338,235 B2 * | 3/2008 | Weghaus et al. | 407/13 |

FOREIGN PATENT DOCUMENTS

| | | |
|---|---|---|
| EP | 1 184 118 | 3/2002 |
| EP | 1 317 982 | 6/2003 |
| JP | 61-214914 | 9/1986 |

* cited by examiner

INTERNAL BROACHING TOOL

CROSS REFERENCE TO RELATED APPLICATIONS

This application is the National Stage of PCT/DE2009/001455 filed on Oct. 17, 2009, which claims priority under 35 U.S.C. §119 of German Application No. 10 2008 053 156.1 filed on Oct. 24, 2008, the disclosure of which is incorporated by reference. The international application under PCT article 21(2) was not published in English.

BACKGROUND OF THE INVENTION (1) Field of the Invention

The invention relates to an internal broaching tool for internal broaching of internal tooth systems.

(2) Description of the Related Art

Internal broaching tools for internal broaching of profiles are known from DIN 1415 (1973 edition), Sheet 1, Page 2.

These internal broaching tools have a shaft, a tooth set part, and an end piece. For internal broaching, the shaft of the internal broaching tool is clamped into the shaft holder of a broaching machine. The profiles to be produced are broached in that the broaching tool, clamped in place as described, is pulled through a work piece that is also disposed in the broaching machine.

After completion of the broaching process and removal of the broached work piece, the end piece of the broaching tool is grasped by an end piece holder of the broaching machine and transported back to its starting position.

The tooth set part of the broaching tool has broaching teeth disposed in multiple rows, one behind the other, counter to the broaching direction.

These broaching teeth are equipped with profile root blades, for cutting the profile root, on the one hand, and furthermore with profile flank blades, for cutting the profile flanks, on the other hand.

The profile root blades are also referred to as main blades, since they perform the main cutting effort, and the profile flank blades are referred to as secondary blades.

The profile root blades of the broaching teeth assigned to one another are disposed one behind the other and have a depth gradation, i.e. an increase in diameter, counter to the broaching direction.

This brings about the result that all the broaching teeth that serve for cutting a profile cut a chip from the profile root, one behind the other.

The profile flank blades, which serve for cutting the flanks of the profile, have a profile gradient counter to the broaching direction, whereby the profile flank blades of the trailing broaching tooth lie laterally free with reference to the profile flank blades of the leading broaching tooth, i.e. are configured to be "narrower," so that the trailing broaching tooth always cuts only in the region provided by means of the depth gradation (increase in diameter). In this way, jamming of the broaching teeth in the region of the profile flanks during the broaching process can be prevented.

As a result of the great stresses on the broaching tool, a displacement of the axis of the tool can come about during the broaching process, and as a result, the broaching teeth that remove material, one after the other, have a different center position with regard to the work piece to be broached.

This center deviation can now have a torsion error superimposed on it in the case of helical broaching, as a result of the additional high rotational forces that occur during helical broaching, and as a result, not only the profile precision but also the surface quality of the profile flanks are impaired.

However, since great profile shape and flank precision is required in the case of gear wheels with internal tooth systems, having a slanted tooth system, in order to guarantee wear-free, precise, and quiet running, it is usual in the state of the art to additionally provide a calibration region after the tooth set part equipped with broaching teeth, counter to the broaching direction.

This calibration region on the broaching tool consists of multiple broaching teeth disposed one behind the other, having the same height, which teeth demonstrate tooth thicknesses that become greater counter to the broaching direction.

These calibration broaching teeth cut a chip over the entire height of the profile flank, in each instance, the chip thickness of which generally amounts to 10 to 20 µm per tooth. These calibration broaching teeth are provided with a clearance angle on their profile flank blades.

Good profile shape precision and very good surface quality are achieved by means of calibration broaching.

By means of the internal broaching tools used in the state of the art, having a calibration part, a system-related broaching force interruption occurs when switching from depth-graduated broaching to full-shape calibration, which interruption leads, particularly in the case of helical broaching, to stress relief of the main cutting force that acts counter to the broaching direction, and thus to a reduction in the torsion stress, and as a result, the relative twist between the work piece and the broaching tool changes. This rebound can now bring about the result that the full-shape calibration region is not correctly introduced into the profiles that have already been broached with depth gradation, so that in the case of incorrect "introduction" of the calibration teeth, which possess sharp blades at both tooth flanks, the profile flanks are then cut on one side, so that the profile is then not calibrated on both profile flanks, as was actually intended.

This partial "rebound" must now be taken into consideration as early as in the design of the broaching tool, i.e. the placement of the broaching teeth of the calibration region.

An incorrect "offset" placement of the calibration broaching teeth with regard to the depth-graduated broaching teeth has the result that the entire broaching tool is unusable.

For this reason, an attempt was already made, by means of a solution previously described in EP 0739674 A1, to eliminate the aforementioned disadvantages in the case of internal broaching tools, in that the broaching teeth disposed one behind the other and assigned to one another possess profile flank blades over their full profile height, which blades have a profile pitch that is small as compared with the increase in diameter of the profile root blades, so that in the case of this solution, the broaching teeth become "thicker."

In the case of this solution, an attempt is made to influence the cutting force in such a manner that a constant torsion force is maintained during the entire broaching process. Relaxation and "rebound" of the torsion twist take place only once the entire broaching process has taken place, and can lead to profile defects.

In order to achieve the desired broaching result by means of this solution, extensive experiments are required. Nevertheless, any variation in work piece material strength characteristics will influence the broaching result and can lead to undesirable profile defects even then.

On the one hand, the complicated and very difficult production is a disadvantage of this solution, since the profile pitches of 1 to 3 µm per tooth can only be measured in total in the machine (for example over 20 teeth).

On the other hand, in the case of this solution presented in EP 0739674 A1, one has no possibility of "correcting" the broaching tool once it has been produced, i.e. for example of changing the tool, if the parameters of the tooth system required by the customer cannot be fulfilled with the broaching tool being used, in such a manner that the customer's wishes can be met with the lowest possible expenditure of costs, so that even in the case of this solution, a new internal broaching tool must always be produced, in time-consuming and cost-intensive manner.

This solution previously described in EP 0739674 A1 was optimized by means of the solution disclosed in EP 1 160 040 A1, whereby the new, optimized solution also, once again, demonstrates the disadvantages explained in connection with EP 0739674 A1.

Furthermore, a broaching tool having a plurality of blade sections having at least three and maximally six teeth, in each instance, in the axis direction, is known from EP 1 184 118 B1, which sections are supposed to avoid an axial displacement, i.e. "untrue running" of the broaching tool during the production of straight profiles. For this purpose, the individual blade sections are separated from one another by means of re-centering guides, which are structured in cylinder shape and have a diameter equal to the diameter of the entry guide, whereby these re-centering guides serve for guidance, on the one hand, and furthermore simultaneously act as a relaxation part between the individual cutting sequences of the internal broaching tool.

The production of such re-centering guides is very complicated and cost-intensive, and nevertheless has the disadvantage that a broaching force interruption in connection with a constant profile gradient leads to an impermissible profile defect, so that the aforementioned solution cannot be used for helical broaching.

A segmented internal broaching tool having multiple guide and relaxation regions disposed between individual cutting sequences was already known from U.S. Pat. No. 1,197,132.

This arrangement of multiple guide and relaxation regions between individual cutting sequences of a segmented internal broaching tool previously described in U.S. Pat. No. 1,197, 132 can be produced in significantly simpler manner, but nevertheless also has the disadvantage already explained above, that when this solution is used, a broaching force interruption occurs, which, in connection with a constant profile gradient, leads to an impermissible profile defect, so that this solution also cannot be used for helical broaching.

In EP 1 317 982 B1, another solution is furthermore disclosed, which further develops the solution already previously described in EP 0739674 A1 and which can be used not only on drawing broaching machines but also on lift-table broaching machines, which are increasingly coming into use. In the case of this internal broaching tool, one of the two profile flanks is finish-machined by means of the roughing part, on the entire work piece, to such an extent that this flank no longer has to be reworked by the calibration region.

This flank, which now already has the final shape, functions as a guiding flank during calibration.

For this reason, the blades on the calibration region are disposed on the calibration teeth only on one side in this solution.

All the calibration teeth have a pressure flank without clearance angle in the same direction.

These pressure flanks lay themselves against the guiding flanks of the work piece, which are already (finally) finished, during calibration.

The flanks of the calibration teeth that lie opposite the guiding flanks are blades provided with a clearance angle.

These blades bring about re-calibration of the pre-finished profile flanks that lie opposite the guiding flanks.

However, aside from the disadvantages that occur analogous to the solution according to EP 0739674 A1, another disadvantage results from this, which consists in that during the broaching process, by means of the solution presented in EP 1 317 982 B1, because of the one-sided smoothing machining, no flank shape corrections (for example corrections of the height convexity to improve the running properties of the tooth system) can be undertaken any longer, since flank shape corrections must always take place on both sides.

Furthermore, a broaching tool is known from JP 61214914 A, in which broaching teeth having blades of the profile root blades disposed exclusively on the outer radii (for pre-broaching/rough broaching) are offset on the face side, after the blades, in each instance, in such a manner that as a result, a guidance region is integrated into each broaching cutting tooth, whereby the "rear" part of each broaching cutting tooth forms this additional guidance region.

In the case of this arrangement disclosed in JP 61214914 A, the broaching teeth are exclusively broaching teeth having profile root blades (these blades, as has already been mentioned, are always disposed (on the tooth head) on the outer radii).

These blades, disposed on the outer radius, are ground to form an undercut (offset) (according to JP 61214914 A), and thereby result in "a continuous tooth" having a front blade part and a rear guidance region.

In the case of this solution, only the upper flanks necessarily guide (in the rear guidance region), so that at best, "untrue running" of the broaching tool can be reduced during pre-broaching.

SUMMARY OF THE INVENTION

The invention is therefore based on the task of developing an internal broaching tool for broaching profiles, which eliminates the aforementioned disadvantages of the state of the art, and allows cost-advantageous, robust, functionally secure and reliable broaching, simple in terms of machine technology, without an allowance, with great profile shape and flank precision on the broached work piece, even in the event of material strength changes of the work piece, so that the actual broached profile precisely corresponds to the reference profile.

These and other objects are accomplished by means of an internal broaching tool in accordance with the invention.

Advantageous embodiments, details, and characteristics of the invention are discussed below or evident from the following description of several exemplary embodiments according to the invention, in connection with ten drawings related to the solution according to the invention.

DETAILED DESCRIPTION OF PREFERRED EMBODIMENTS

Figure 1:
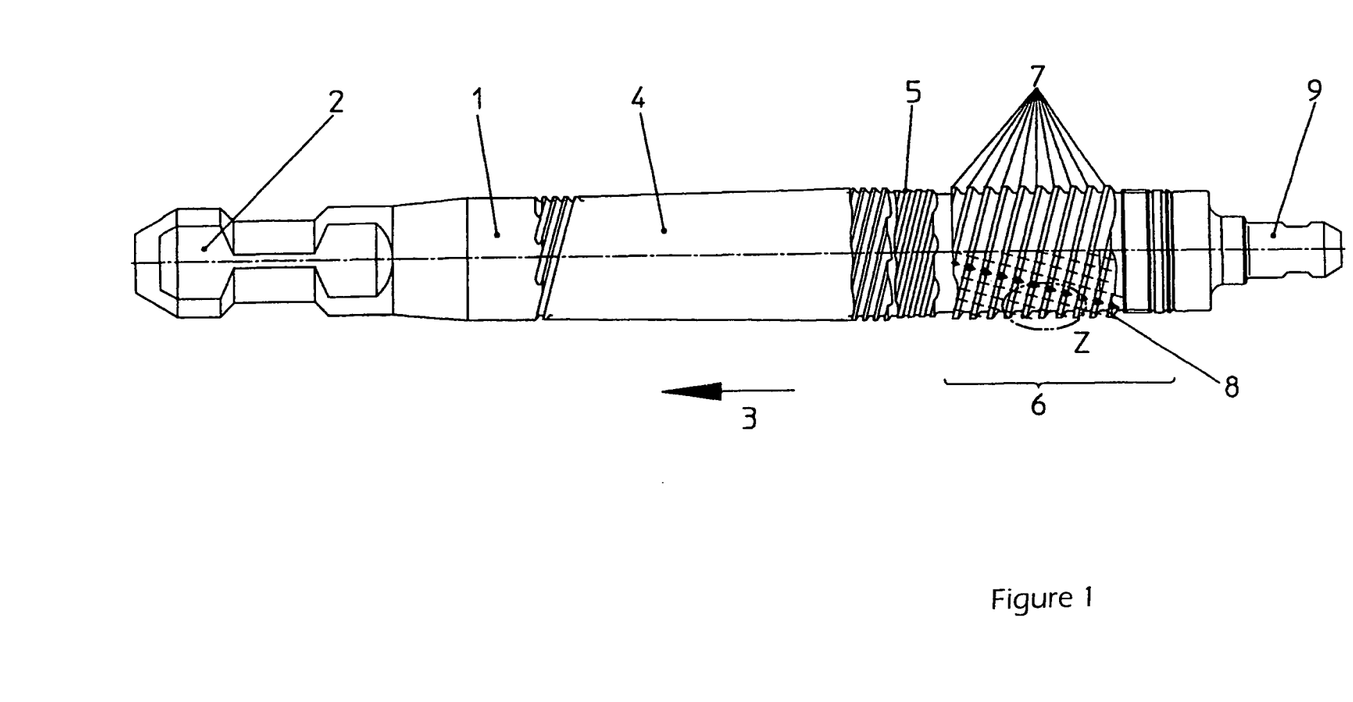
FIG. 1: the internal broaching tool with calibration part 6 in one of the possible embodiments according to the invention.

The internal broaching tool 1 according to the invention, for internal broaching of internal tooth systems having a profile root and profile flanks, consisting of a shaft 2, of a tooth set part 4 disposed adjacent to the shaft 2, counter to the broaching direction 3, having multiple broaching teeth disposed in rows, one behind the other, with profile root blades for pre-broaching (rough broaching) of a profile, assigned to one another, of a calibration part 6 disposed to follow counter to the broaching direction 3, having multiple calibration broaching teeth 8 disposed in rows 7, one behind the other, and of an end piece 9, is shown in FIG. 1, whereby according to the invention, a relaxation part 5 is disposed between the tooth set part 4 and the calibration part 6.

This placement of the relaxation part 5 according to the invention brings about relaxation of the work piece before the calibration machining, so that the deformations of the work piece that result from the cutting forces that occur during broaching are cancelled out not only after completion of the broaching process, and therefore, by means of the solution according to the invention, the final dimensions can be produced in significantly simpler and more reliable manner, without taking material tolerances into consideration.

Figure 2:
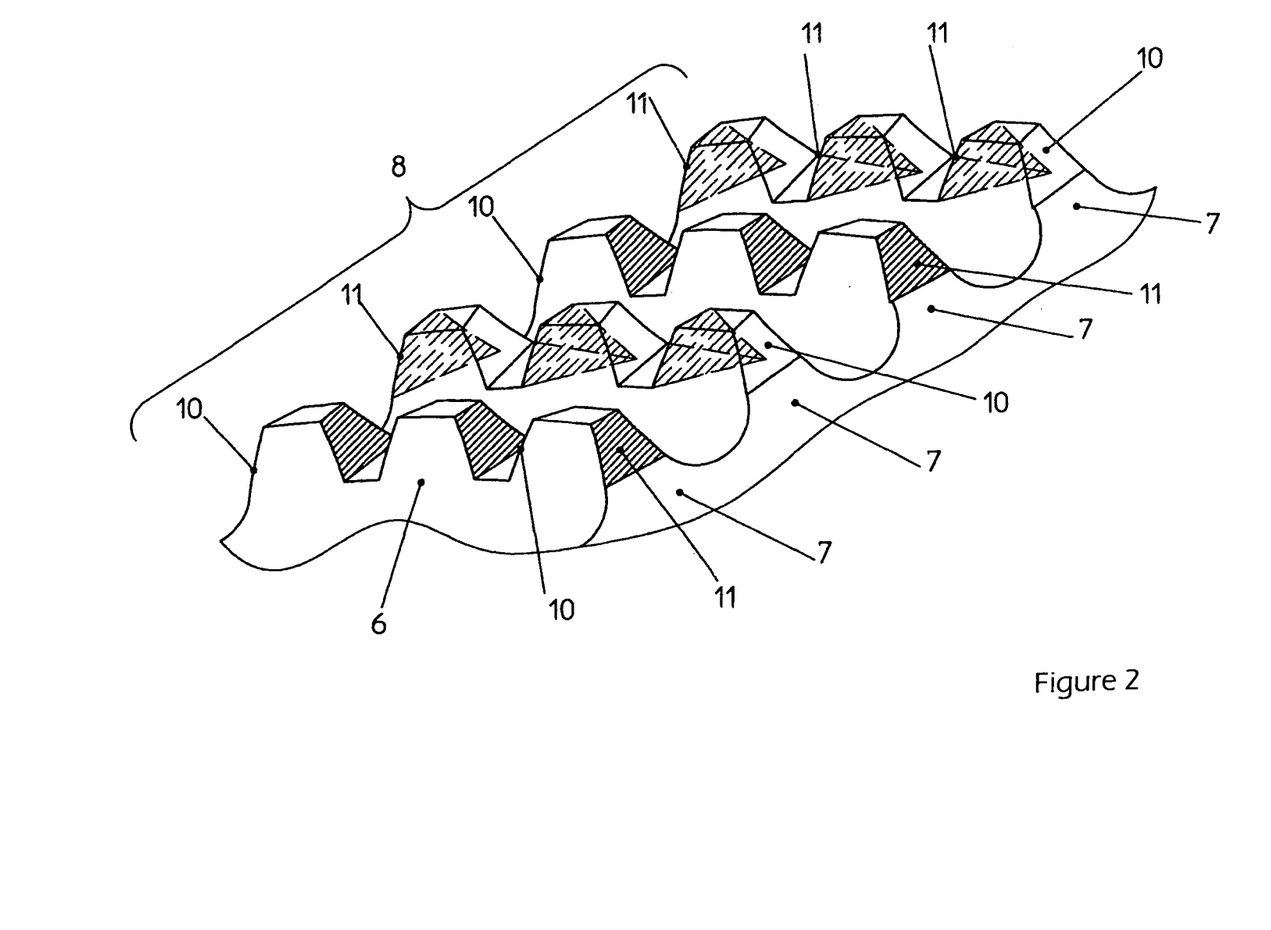
FIG. 2: the detail "Z" of the calibration part 6 from FIG. 1 with an embodiment of the calibration broaching teeth 8, according to the invention, in a spatial representation.

FIG. 2 shows the detail "Z" of the calibration part 6 from FIG. 1 with one of the embodiments of the calibration broaching teeth 8 according to the invention, in a spatial representation.

This embodiment of the solution according to the invention, shown in FIG. 2, is characterized, according to the invention, in that the calibration broaching teeth 8 in the adjacent rows 7 on the calibration part 6 are configured in such a manner that they are provided, in each instance, with a guiding flank 10 (without a clearance angle/or with a negative clearance angle less than/equal to 0.1°), and a cutting flank 11 (having a positive clearance angle), and in the adjacent rows 7, the placement of the guiding flanks 10 and the cutting flanks 11, in each instance, is alternately offset relative to one another on the calibration broaching teeth 8 disposed one behind the other counter to the broaching direction, whereby each guiding flank 10 that follows counter to the broaching direction 3 is assigned, in terms of its position, its shape, and its size, to the cutting flank 11 assigned in the "leading" row 7 (i.e. the flank of the broaching tooth), in each instance.

Figure 3:
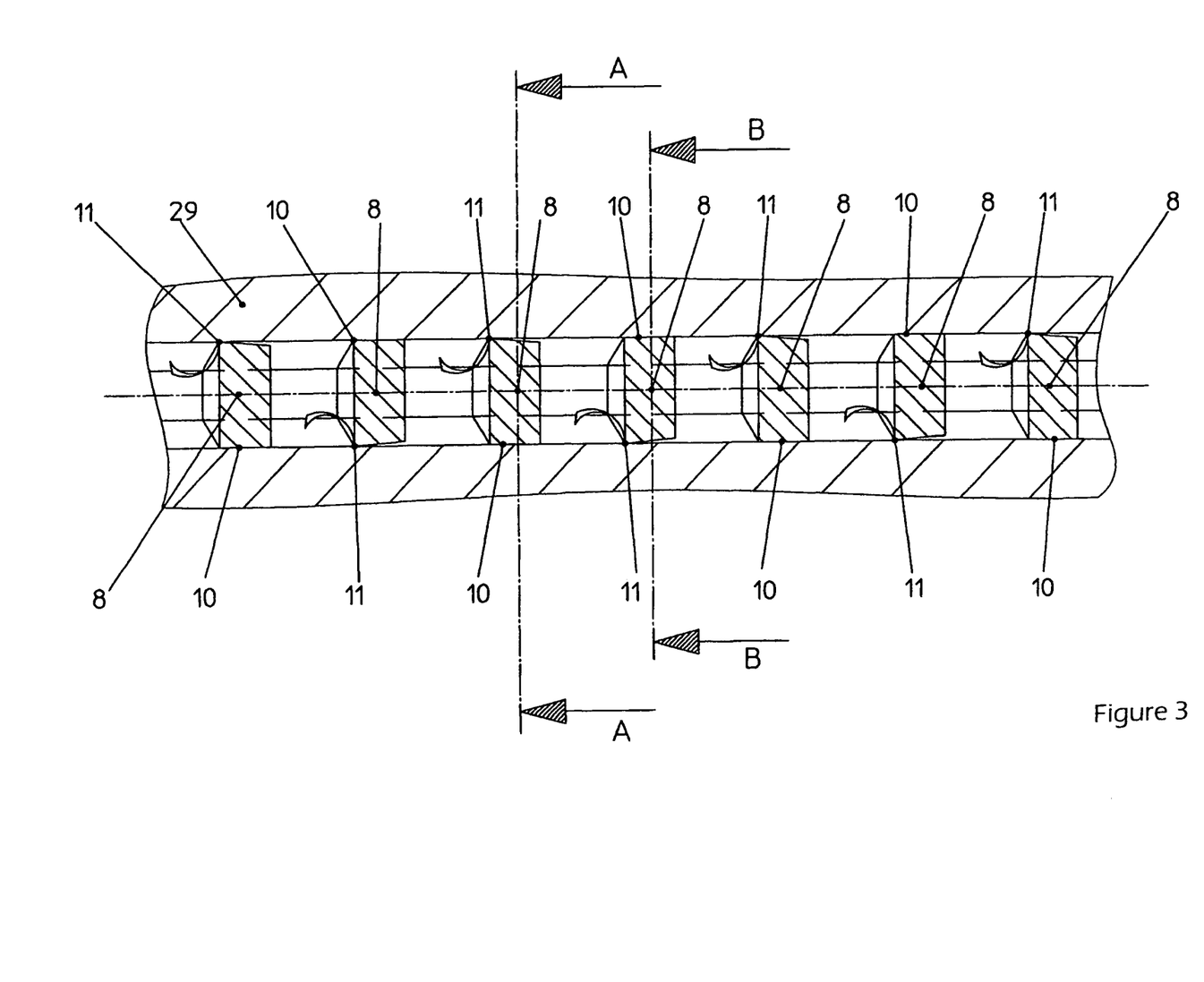
FIG. 3: partial section at C-C according to FIGS. 4 and 5 through the work piece 29, during calibration broaching with a calibration part 6 configured according to FIG. 2, according to the invention.
Figure 4:
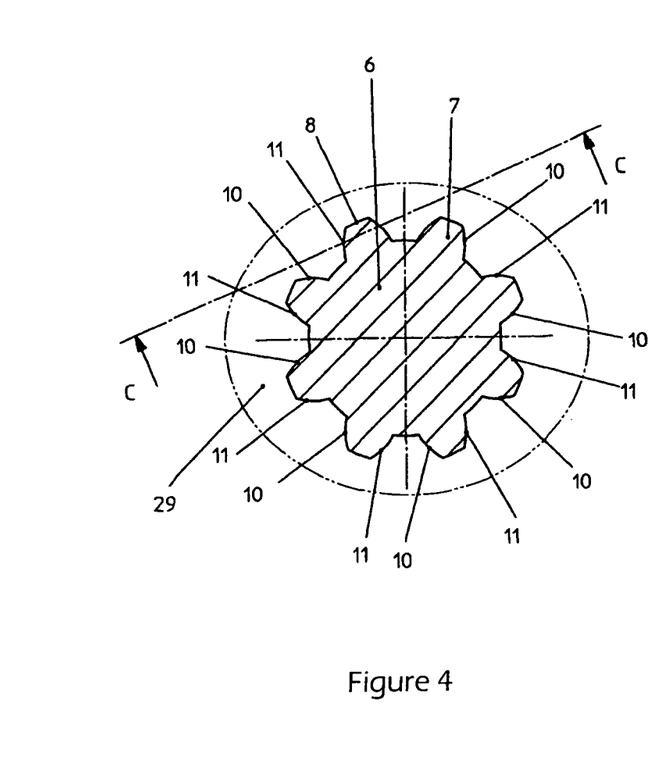
FIG. 4: section at B-B according to FIG. 3, through the work piece 29, during calibration broaching with a calibration part 6 configured analogous to FIG. 2, according to the invention, in a side view.
Figure 5:
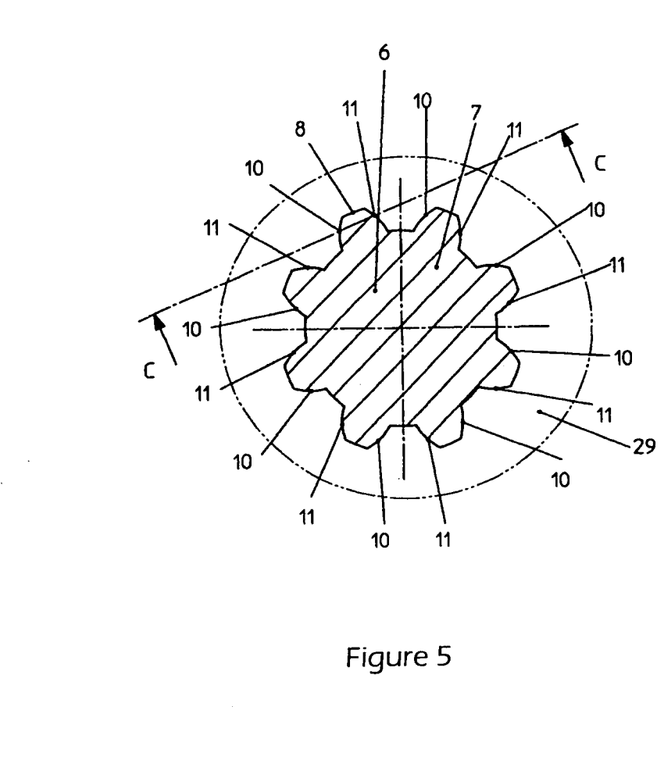
FIG. 5: section at A-A according to FIG. 3, through the work piece 29, during calibration broaching with a calibration part 6 configured analogous to FIG. 2, according to the invention, in a side view.

This placement, according to the invention, of the calibration broaching teeth 8 on the calibration part 6, according to the invention, shown spatially in FIG. 2, brings about, as shown in FIG. 3, a partial section at C-C according to FIGS. 4 and 5 through the work piece 29, during calibration broaching, alternate machining of the flanks of the work piece 29, with precise guidance of the cutting flanks 11 at all times, during broaching, by means of the guiding flank 10, even during helical broaching. The placement according to the invention brings about the result that no twisting and no displacement of the broaching tool center axis can occur, and therefore the internal broaching tool according to the invention is very well suited for broaching profiles, and also optimally suited for helical broaching, even in the case of thin-walled (unstable) work pieces.

In this connection, the solution according to the invention can be produced in simple and cost-advantageous manner, in terms of machine technology, is robust, and always guarantees functionally secure, reliable broaching with great profile shape and flank precision on the broached work piece, so that the profile actually broached using the solution according to the invention always corresponds to the reference profile.

In FIG. 4, the section in the row at B-B according to FIG. 3, through the work piece 29, during calibration broaching with the calibration part 6 configured analogous to FIG. 2, according to the invention, is now shown in a side view.

FIG. 5 shows the section through the immediately adjacent row 7 of the row 7 shown in FIG. 4, i.e. the section at A-A according to FIG. 3, through the work piece 29, during calibration broaching with a calibration part 6 configured in accordance with FIG. 2, according to the invention, in a side view.

By means of this embodiment according to the invention, shown in FIGS. 2 to 5, which is also characterized in that on the calibration part 6, the calibration broaching teeth 8 disposed next to one another in one of the rows 7 are configured in such a manner that along the circumference of a row 7 of calibration teeth 8, a cutting flank 11 (having a positive clearance angle) is always disposed adjacent to a guiding flank 10 (without a clearance angle/or with a negative clearance angle less than/equal to 0.1°).

Another embodiment of the solution according to the invention, not shown graphically here, is characterized in that on the calibration part 6, the calibration broaching teeth 8 disposed next to one another in one of the rows 7 are configured in such a manner that along the circumference of a row 7 of calibration broaching teeth 8, alternately either two guiding flanks 10 (without a clearance angle/or with a negative clearance angle less than/equal to 0.1°) or two cutting flanks 11 (having a positive clearance angle) are disposed adjacent to each broaching tooth base, on both sides.

Figure 6:
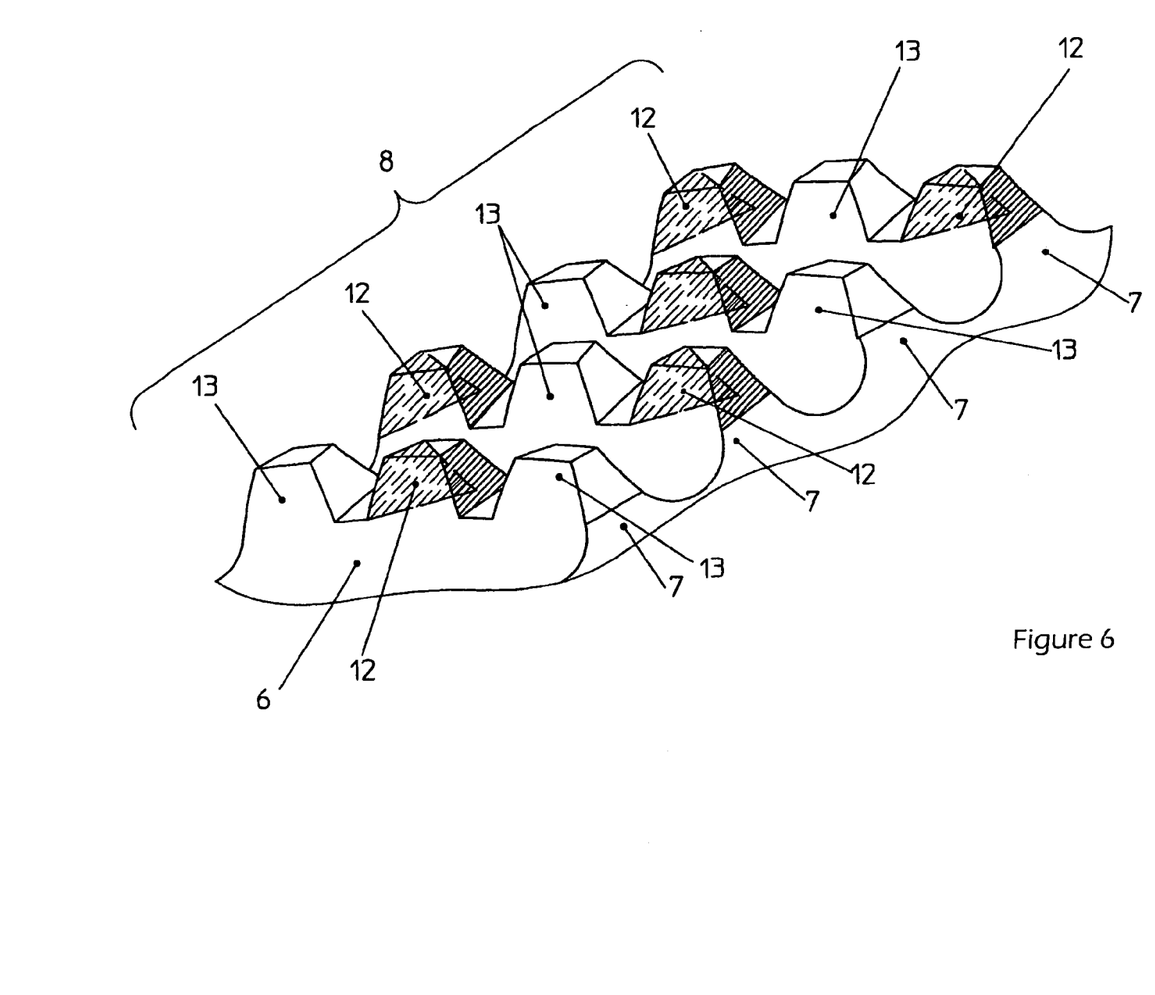
FIG. 6: the detail "Z" of the calibration part 6 from FIG. 1, with another embodiment, according to the invention, of the calibration broaching teeth 8, in a spatial representation.

In FIG. 6, the detail "Z" of the calibration part 6 from FIG. 1, in another embodiment according to the invention, is shown in a spatial representation.

This embodiment, according to the invention, of the solution according to the invention, shown spatially in FIG. 6, is characterized in that on the one hand, broaching cutting teeth 12 (whose two flanks have a positive clearance angle) and on the other hand, broaching guiding teeth 13 (whose two flanks have no or a negative clearance angle less than/equal to 0.1°) are disposed on the calibration part 6, as broaching teeth 8, in such a manner that in a row 7, a broaching guiding tooth 13 is always disposed next to a broaching cutting tooth 12, whereby each broaching guiding tooth 13 that follows counter to the broaching direction (3) is assigned to the broaching cutting tooth 12 in the "leading" row 7 (or the broaching tooth disposed on the leading adjacent tooth set part), in terms of its position, its shape, and its size.

Figure 7:
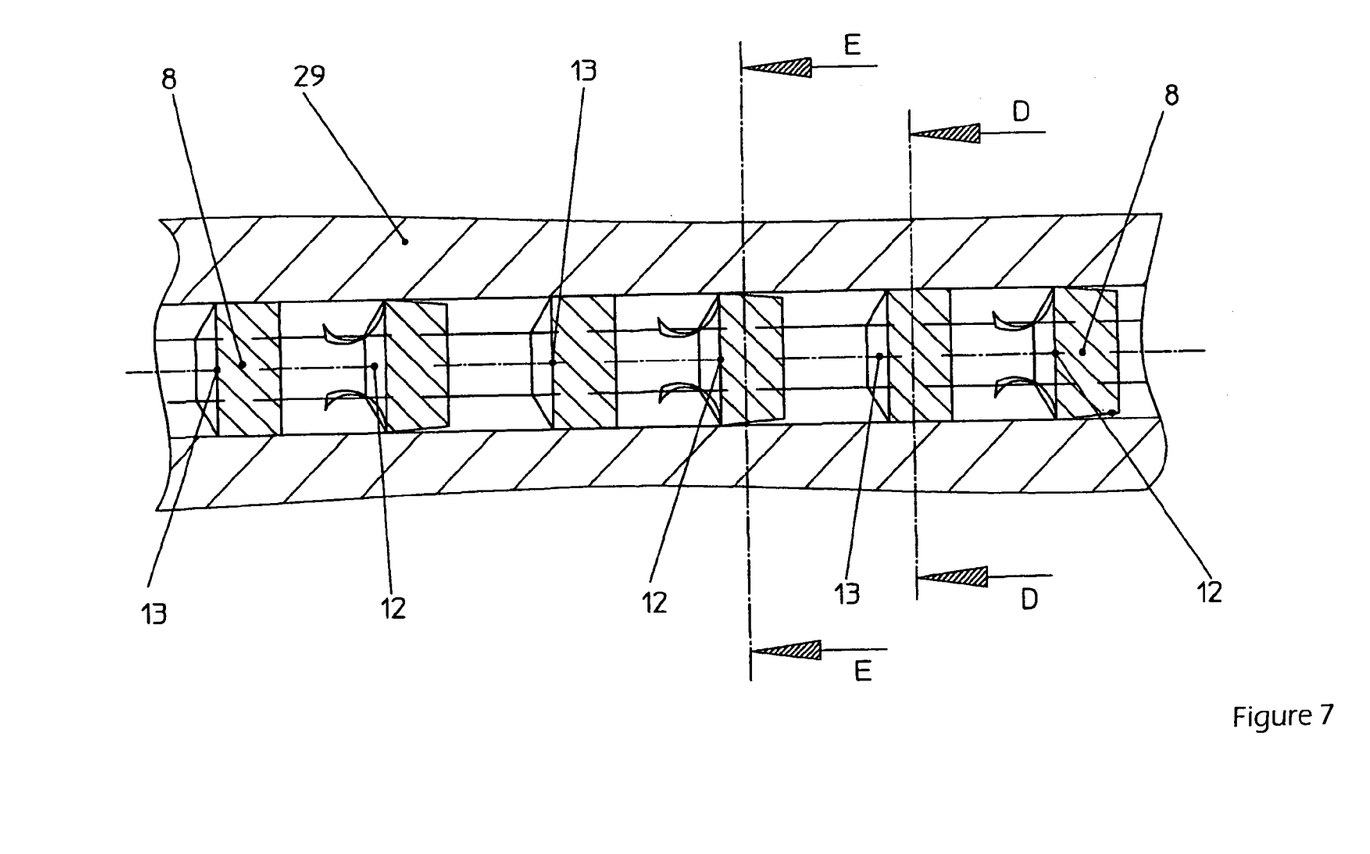
FIG. 7: partial section at F-F according to FIGS. 8 and 9 through the work piece 29, during calibration broaching with a calibration part 6 configured in accordance with FIG. 6, according to the invention.
Figure 8:
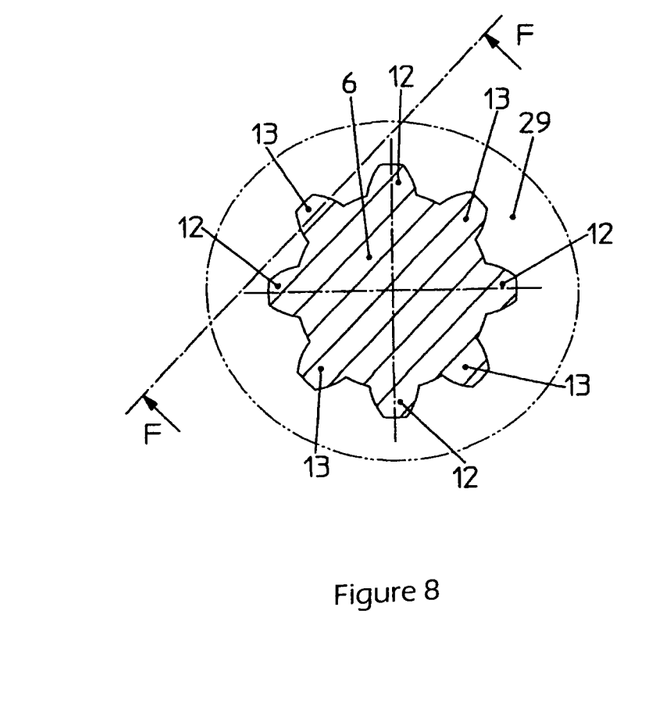
FIG. 8: section at D-D according to FIG. 7, through the work piece 29, during calibration broaching with a calibration part 6 configured analogous to FIG. 6, according to the invention, in a side view.
Figure 9:
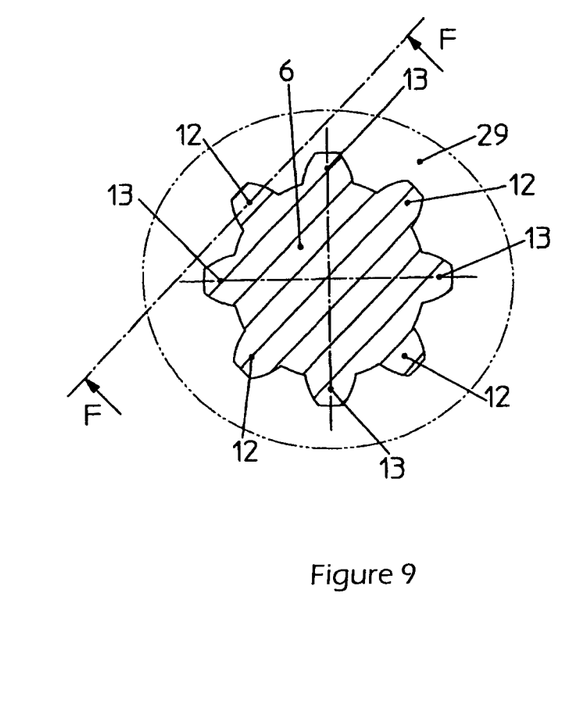
FIG. 9: section at E-E according to FIG. 7, through the work piece 29, during calibration broaching with a calibration part 6 configured according to FIG. 6, according to the invention, in a side view.

This placement, according to the invention, of special calibration broaching teeth 8 according to the invention on the calibration part 6 brings about, as is shown in FIG. 7, a partial section at F-F according to FIGS. 8 and 9 through the work piece 29, during calibration broaching, two-sided machining of the flanks of the work piece 29 by means of the broaching cutting teeth 12, with always precise guidance of the broaching cutting teeth 12 during broaching, by means of the broaching guiding teeth 13 disposed between them, even during helical broaching.

This special construction of the solution according to the invention is therefore particularly well suited if fewer than three rows of teeth come into engagement during broaching.

In FIG. 8, the calibration part 6 shown in FIG. 6 is now shown in a section at D-D according to FIG. 7, through the work piece 29, during calibration broaching, in a side view.

FIG. 9 shows the section through the adjacent row 7 shown in FIG. 7, i.e. the section at E-E according to FIG. 7, through the work piece 29, during calibration broaching with a calibration part 6 configured according to FIG. 6, according to the invention.

In the case of all the embodiments of the solution according to the invention for broaching profiles that have been presented until now, the calibration part provided with a tooth system according to the invention is rigidly disposed on the internal broaching tool and is also very well suited for helical broaching. All the constructions of the solution according to the invention can furthermore be produced in very cost-advantageous manner and guarantee great profile shape and flank precision of the broached work piece.

Figure 10:
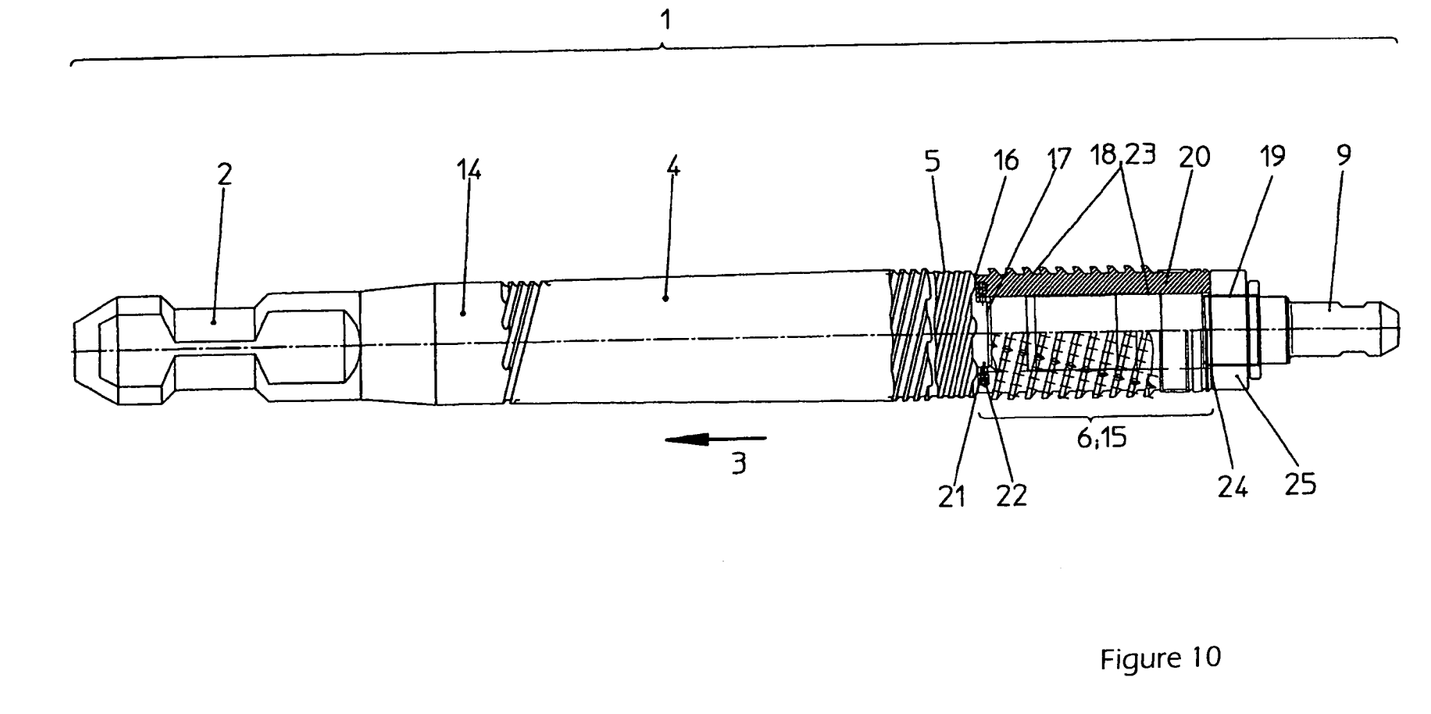
FIG. 10: the internal broaching tool according to the invention, with a special, advantageous embodiments of the calibration part 6, in the form of a calibration bushing 20 that is "adjustable" with regard to the tooth set part 4.

A special, very advantageous embodiment of the calibration part 6 of an internal broaching tool, configured according to the invention, is now shown in FIG. 10.

In this very advantageous embodiment, the calibration part configured according to the invention is configured as a calibration bushing 20 that is "adjustable" with regard to the tooth set part 4.

In the case of this embodiment shown in FIG. 10, the internal broaching tool 1 consists of a broaching tool base body 14 having a shaft 2, a tooth set part 4 disposed adjacent to the shaft 2, counter to the broaching direction 3, and an end piece 9, whereby a bushing accommodation region 15 having a bushing contact crosspiece 16, disposed adjacent to the tooth set part 4, a bushing entrainment region 17, a bushing guidance region 18 disposed adjacent to the former region, counter to the broaching direction 3, and a bushing attachment region 19, situated between the bushing guidance region 18 and the end piece 9, is disposed between the tooth set part 4 and the end piece 9, whereby the calibration part 6 is now disposed on the bushing accommodation region 15 as a calibration bushing 20.

According to the invention, a relaxation part 5, in turn, is disposed between the tooth set part 4 and the calibration part 6.

It is characteristic, in this connection, that this calibration bushing 20 is provided with an entrainer accommodation 21 that enters into an action connection with the bushing entrainment region 17 and is disposed adjacent to the tooth set part 4, as well as with multiple setting elements 22 adjustably disposed in the region of the entrainer accommodation 21, in the calibration bushing 20, and with a guide bore 23 that is axially disposed in the calibration bushing 20 and enters into an action connection with the bushing guidance region 18.

It is furthermore characteristic that a contact collar 24 is disposed on the end side, on the calibration bushing 20, lying opposite the entrainer accommodation 21, and a position securing element 25 that enters into an action connection with the bushing attachment region 19 of the broaching tool base body 14 is disposed adjacent to this contact collar 24 of the calibration bushing 20.

This arrangement according to the invention allows a correction of broaching errors, since a different progression of the calibration can become necessary, for example, by means of a change in the main cutting force or a change in the torsion forces (dulling of the tool, change in the strength parameters of the work piece, etc.). This requirement can now be met by means of the solution according to the invention, by means of rotating the calibration bushing 20 either in the positive or the negative direction of rotation, whereby the setting elements 22 that act on the dihedron, in combination with the action connection between the bushing entrainment element 17 on the broaching tool base body 14 and the entrainer accommodation 21 disposed on the calibration bushing 20 always guarantee a secure and reliable transfer of force.

It is furthermore advantageous in the case of this special construction equipped with a calibration bushing 20 that in the bushing attachment region 19, an outside thread 26 is disposed on the broaching tool base body 14, on which a bracing nut 27 and a securing nut 28 are disposed as a position securing element 25, next to one another, counter to the broaching direction 3.

This placement of a bracing nut 27 and a securing nut 28 according to the invention allows simple and secure positioning of the calibration bushing 20 on the broaching tool base body 1.

REFERENCE SYMBOL LIST 1 internal broaching tool
2 shaft
3 broaching direction
4 tooth set part
5 relaxation part
6 calibration part
7 row
8 calibration broaching teeth
9 end piece
10 guiding flank
11 cutting flank
12 broaching cutting teeth
13 broaching guiding teeth
14 broaching tool base body
15 bushing accommodation region
16 bushing contact crosspiece
17 bushing entrainment region
18 bushing guidance region
19 bushing attachment region
20 calibration bushing
21 entrainer accommodation
22 setting element
23 guide bore
24 contact collar
25 position securing element
26 outside thread
27 bracing nut
28 locking nut
29 work piece

The invention claimed is:

1. An internal broaching tool for internal broaching of internal tooth systems having a profile root and profile flanks, said internal broaching tool comprising:
   (a) a shaft;
   (b) a tooth set part disposed adjacent to the shaft counter to a broaching direction, said tooth set part having a plurality of broaching teeth disposed in rows, one behind the other, said broaching teeth comprising profile root blades for pre-broaching of a profile, assigned to one another;
   (c) a calibration part disposed to follow the tooth set part counter to the broaching direction, said calibration part having a plurality of calibration broaching teeth disposed in rows, one behind the other;
   (d) an end piece; and
   (e) a relaxation part disposed between the tooth set part and the calibration part;
   wherein each calibration broaching tooth comprises a guiding flank without a clearance angle or with a negative clearance angle less than or equal to 0.1° and a cutting flank having a positive clearance angle;
   wherein in adjacent rows of the calibration broaching teeth on the calibration part each guiding flank and cutting flank is alternately offset relative to one another on the calibration broaching teeth disposed one behind the other counter to the broaching direction, and each guiding flank that follows counter to the broaching direction is associated in terms of position, shape, and size, with a corresponding cutting flank in a leading row.

2. An internal broaching tool for internal broaching of internal tooth systems having a profile root and profile flanks, said internal broaching tool comprising:
   (a) a shaft;
   (b) a tooth set part disposed adjacent to the shaft counter to a broaching direction, said tooth set part having a plurality of broaching teeth disposed in rows, one behind the other, said broaching teeth comprising profile root blades for pre-broaching of a profile, assigned to one another;
   (c) a calibration part disposed to follow the tooth set part counter to the broaching direction, said calibration part having a plurality of calibration broaching teeth disposed in rows, one behind the other;
   (d) an end piece; and
   (e) a relaxation part disposed between the tooth set part and the calibration part;
   wherein the calibration broaching teeth comprise broaching cutting flanks having a positive clearance angle and broaching guiding flanks without a clearance angle or with a negative clearance angle less than or equal to 0.1°;
   wherein in a row of the calibration broaching teeth on the calibration part each broaching guiding flank is always disposed next to a broaching cutting flank, and each guiding flank that follows counter to the broaching direction is associated in terms of position, shape, and size, with a corresponding cutting flank in a leading row.

3. The internal broaching tool according to claim 1, wherein on the calibration part, the calibration broaching teeth disposed next to one another in one of the rows are configured in such a manner that along a circumference of a row of calibration teeth, a cutting flank is always disposed adjacent to a guiding flank.

4. The internal broaching tool according to claim 1, wherein on the calibration part, the calibration broaching teeth disposed next to one another in one of the rows are configured in such a manner that along a circumference of a row of calibration broaching teeth, alternately either two guiding flanks or two cutting flanks are disposed adjacent to each broaching tooth base, on both sides.

5. The internal broaching tool according to claim 1, wherein the calibration part comprises a calibration bushing that is adjustable relative to the tooth set part.

* * * * *